Nov. 29, 1960    C. E. MARSHALL    2,961,890
AUTOMOTIVE GEAR SHIFT MECHANISM
Filed Dec. 4, 1959    2 Sheets-Sheet 1

(NEUTRAL)

(NEUTRAL)

(NEUTRAL)

(FIRST GEAR)

INVENTOR.
CLARK E. MARSHALL
BY
Reynolds, Beach & Christensen
ATTORNEYS

Nov. 29, 1960 — C. E. MARSHALL — 2,961,890
AUTOMOTIVE GEAR SHIFT MECHANISM
Filed Dec. 4, 1959 — 2 Sheets-Sheet 2

(SECOND GEAR)

(THIRD GEAR)

(REVERSE GEAR)

INVENTOR.
CLARK E. MARSHALL
BY
ATTORNEYS

United States Patent Office 2,961,890
Patented Nov. 29, 1960

2,961,890

AUTOMOTIVE GEAR SHIFT MECHANISM

Clark E. Marshall, 10814 NE. 112th, Kirkland, Wash.

Filed Dec. 4, 1959, Ser. No. 857,294

5 Claims. (Cl. 74—477)

This invention relates to a new and improved mechanical device for operating the actuating members or arms of a standard automotive transmission or the like. The invention is herein illustratively described by reference to the presently preferred embodiment thereof; however, it will be recognized that certain modifications and changes therein with respect to details may be made without departing from the underlying essentials involved.

In the standard gear shift mechanism for automobiles having a standard type transmission, the customary shift pattern on American-made cars, at least, is in the form of the letter H. This is true whether the gear shift lever is mounted on the floor of the vehicle or on the side of the steering column. In either case the time delay incurred in the process of shifting from first gear to second gear and between second and third gears is objectionable, particularly in cars used for racing. Moreover, the danger of damaging the transmission is ever present in attempting to shift gears with a standard gear shift mechanism under racing conditions. Apart from the time element involved in shifting gears with a standard type transmission, there is certain objection to the amount of effort involved in executing the requisite H-pattern movement.

A broad object of the present invention is to provide an improved gear shift mechanism for standard or equivalent transmissions having two separate operating members such as the conventional actuating arms of the standard transmission, which will permit the shifting operation to take place with a single lever arm operated in a single plane of motion, thereby to permit shifting gears very rapidly and very easily.

A further object of the invention is in the provision of a relatively simple and reliable shifting mechanism of the character described which is highly durable, easily installed either in the original automobile or as a remodeling kit for existing vehicles, and which is made up of comparatively few and inexpensively manufactured parts.

Still another object is such a transmission shifting mechanism wherein the single operating arm starting in the neutral position or setting of the transmission and gear shift mechanism may be moved through a three-speed change of gears directly in a swinging or sweeping motion in a single plane and without necessity for endwise motion or any other form of collateral motion in order to accomplish the three-stage action required. In other words, from its neutral position the arm is swung first one way to a limiting position placing the vehicle in first or low gear, then the arm may be swung directly and without hesitation or manually produced collateral motion, in the same plane, to an opposite position in order to shift into the second or intermediate gear, and finally the arm may then be shifted directly back in the opposite direction, still in the same plane and without any hesitation or collateral motion, in order to shift the transmission into third or high gear. The associated shifting mechanism automatically selects the appropriate operating member or arm on the transmission proper in order to select the appropriate forward drive gears during the simple planar motion of the manual shifting arm.

As herein disclosed the invention comprises a pair of sector plates and shifting means including an operating arm, mounted on a common axis, with one plate slotted in an arc spaced from the pivot axis and the other plate having a guide edge also spaced from said axis. Both the guide edge and the slot are notched, the notches extending radially in opposite directions from each other, and the shifting means includes elements which project into these notches selectively under the influence of a spring and manually applied pressure opposing the spring as necessary in order to engage the notches. The sector plates in turn are connected through coupling rods to the actuating members of the transmission. With this mechanism it is necessary to move the shifting arm endwise of itself only in order to gain access to first or low gear from neutral position, or to gain access to reverse gear from neutral position. The return action of the spring device assures automatic selection of the appropriate sector plate during shifting from low gear to second gear and during shifting between second gear and third gear in either direction.

These and other features, objects and advantages of the invention will become more fully evident from the following description thereof by references to the accompanying drawings.

Figure 1:
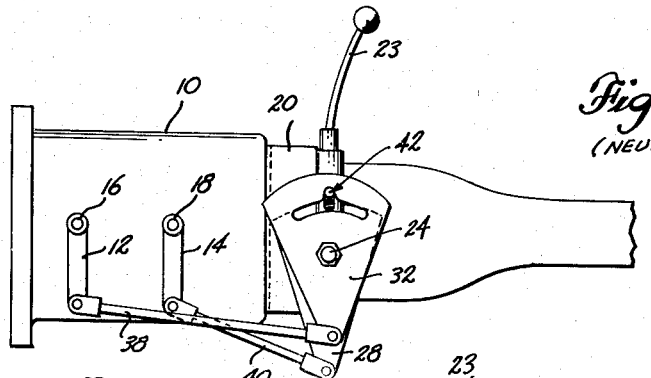
Figure 1 is a simplified side view of a standard type transmission housing with actuating arms and with the illustrated embodiment of the inventive mechanism mounted thereon, the mechanism being shown in its neutral setting.

In Figure 1 the illustrated standard type transmission comprises a main housing 10 on one side of which are mounted the pivoted actuating arms 12 and 14. These arms are rigidly mounted on the supporting shafts 16 and 18 and may occupy either of three operating positions, that shown representing the neutral position wherein the arms are substantially parallel and hang substantially vertically from their horizontal supporting shafts. In the illustrated case the arm 14 when swung rearwardly from its depicted position shifts the transmission into first or low-speed gear ahead, and when swung forwardly from its depicted position shifts the transmission into reverse gear setting. On the other hand, arm 12 when swung forwardly from its depicted position shifts the transmission into the second or intermediate-speed setting, whereas when it is swung rearwardly from its depicted position shifts the transmission into the third or high-speed forward setting.

The novel mechanism comprising this invention is provided with a suitable mounting base in the form, for example, of an angle-iron bracket 20 mounted by bolts 22 on the side of the transmission housing at a suitable location in order to position the operating arm 23 conveniently to the vehicle driver. The base side flange 20a has a bolt hole which receives the machine bolt 24, the head of which is welded as at 24a to the flange in order to provide a permanent mounting. On the projecting bolt shank a collar shim 26 is first mounted immediately adjacent to the outer face of the base flange 20a, and next to this shim is mounted an operating lever 28 of the first class (i.e., pivoted intermediate its ends), preferably in the from of a sector plate. Next to the lever 24 is mounted the collar portion 30a of the shifting arm support 30.

On the opposite side of the collar 30a from the lever 28 is a second operating lever 32, also of the first class, and the assembly is retained on the bolt shank by a nut 34 and cotter key 36. The members 28, 30a and 32 are free to pivot independently of each other on the bolt shank as a common supporting shaft. The nut 34 is therefore not tightened sufficiently to clamp the members together but only serves as a convenient stop which holds them in position.

Sector plate lever 32 has an elongated arcuate slot 32a therein approximately concentric to the axis of bolt 24. This slot is formed in the broader end portion of the sector plate, whereas the opposite end portion thereof is pivotally connected at 32b to the transmission actuating arm 12 by means of the coupling rod 38. Intermediate the ends of the slot 32a the outer edge of the slot has a notch 32a'. The sector plate lever 28 has an arcuate guide edge 28a approximately concentric to the axis of bolt 24. This guide edge extends along the broad end portion of the sector plate, whereas the opposite end portion thereof at 28b is connected by way of coupling rod 40 to the end of the actuating lever 14. In the example the radius of the arcuate guide edge 28a is substantially at least equal to that of the outer edge of slot 32a and in registry therewith. While it is preferred that the guide slot 32a and the guide edge 28a comprise substantially circular arcs approximately concentric to the axis of bolt 24, true circular curvature is not essential nor is concentricity to the bolt axis, provided the relationship of the curvature of the outer edge of slot 32a and that of guide edge 28a is such that the slot 32a can serve a keeper or guide function for the locking elements to be described.

Figure 2:
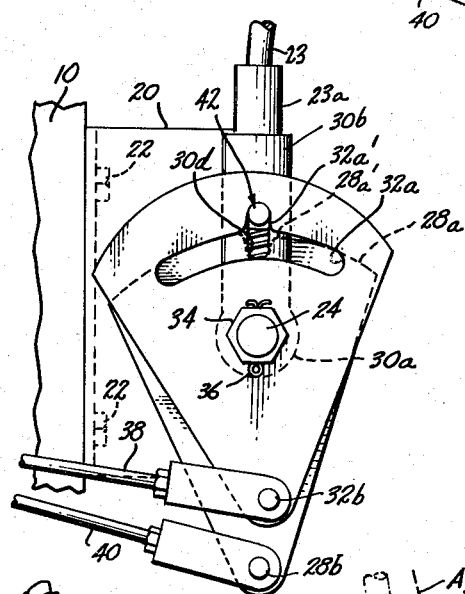
Figure 2 is an enlarged side view of the improved shifting mechanism, the mechanism being shown in its neutral setting.
Figure 3:
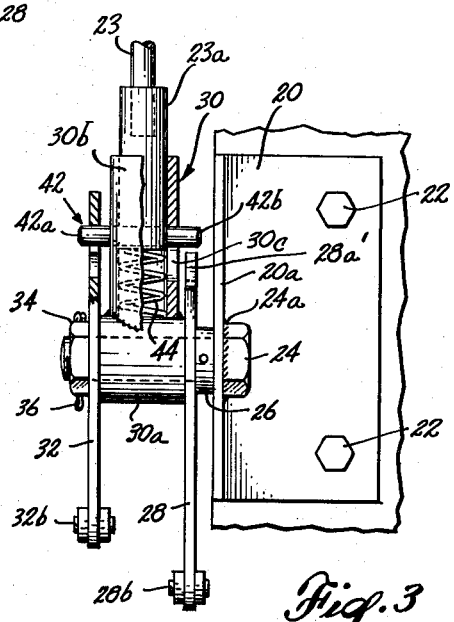
Figure 3 is an end view of the improved shifting mechanism, with parts broken away to show certain details of construction, the mechanism being shown in its neutral setting.

The support means 30 for the shifting arm 28 comprises a tubular socket 30b projecting transversely from the supporting sleeve 30a into which socket the enlarged lower end portion 23a is slidably fitted. Two elongated slots 30c and 30d are formed in opposite locations in the socket 30b, and the oppositely projecting end portions of a locking pin 42, press-fitted in the arm enlargement 23a, project transversely to the arm out through these slots. One end of the pin 42a comprises a locking element adapted to lodge in the notch 32a' of slot 32a and to move freely lengthwise of the slot when disengaged from this notch. The opposite end of the pin 42b comprises a cooperative locking element adapted to engage in the notch 28a' formed in guide edge 28a. A helical spring 44 is lodged in the base of the socket 30b and reacts outwardly against the end of the arm base 23a in order to urge the latter outwardly away from the axis of bolt 24 and thereby tends to urge the locking element 42a into the notch 32a' when in registry therewith. In order to disengage the pin from the notch 32a' and thereby simultaneously lodge the element 42b in the notch 28a' endwise force or thrust, applied manually to the shifting arm 23, is necessary, overcoming the force of the spring 44. This movement of the pin from one notch to the other may be effected only when the two operating levers 28 and 30 are in the neutral position as shown in Figures 2 and 3. In all other positions the guide edge 28a prevents the pin from moving out of the notch 32a' when retained in that notch initially, whereas the outer edge of the slot 32a prevents the pin from moving out of the notch 28a' if it is in that notch initially. The radially inner edge of guide slot 32a is spaced sufficiently from the corresponding outer edge thereof to permit free movement of the pin element 42a lengthwise in the slot, but such inner edge need not be parallel to the outer edge necessarily nor of any particular configuration, inasmuch as it is not of itself required to perform any guiding function as such.

Figure 7:
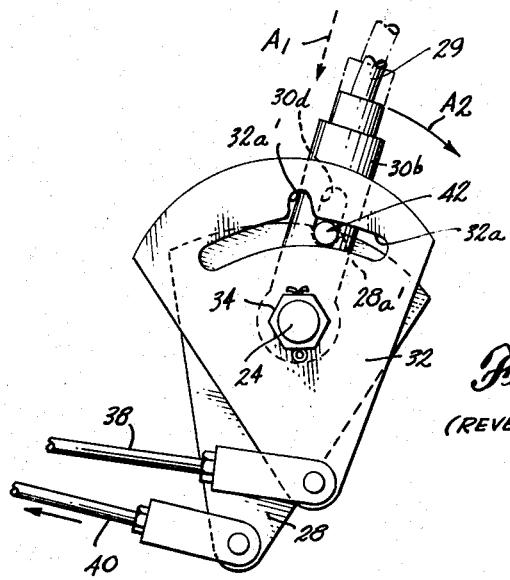
Figure 7 is a similar view with the mechanism shown in the process of shifting into reverse gear position.

In the operation of the mechanism, commencing with the neutral setting shown in Figures 1, 2 and 3, if the operator wishes to place the transmission in reverse gear, he has only to force the shifting arm endwise as shown by the dotted arrow A1 in Figure 7, thereby disengaging the pin element 42a from the notch 32a' and simultaneously engaging the pin element 42b in the notch 28a', whereupon the shifting arm is swung in the direction of the arrow A2 in order to swing the operating lever 28 and thereby the arm 14 into a limiting position representing reverse-gear setting of the transmission (Figure 7). In order to shift from reverse-gear setting into any other position, it is necessary to return the operating arm 23 into the neutral position. When this position is reached, the return spring 44 automatically displaces the arm outwardly (unless it is held inwardly by the operator) and re-engages the pin element 42a in the notch 32a' while simultaneously disengaging the pin element 42b from the notch 28a'.

Figure 4:
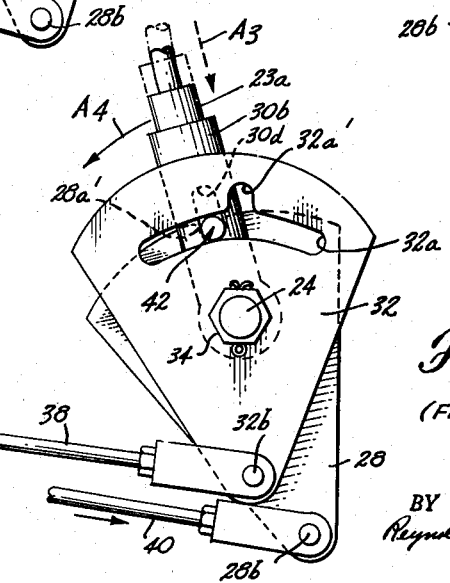
Figure 4 is a side view corresponding to Figure 2 with the gear shift mechanism in the setting corresponding to first-speed or low-gear forward position, or in the process of moving from neutral position toward such first-mentioned position.

Thereupon, in order to shift into first gear ahead, the operator first depresses the shifting arm 23 as shown by the dotted arrow A3 (Figure 4) in order to disengage the pin element 42a from the notch 32a' and simultaneously engage pin element 42b in notch 28a', whereupon the shifting arm is swung forwardly in the direction of the arrow A4 in order to swing the actuating arm 14 into the low or first-gear setting.

Figure 5:
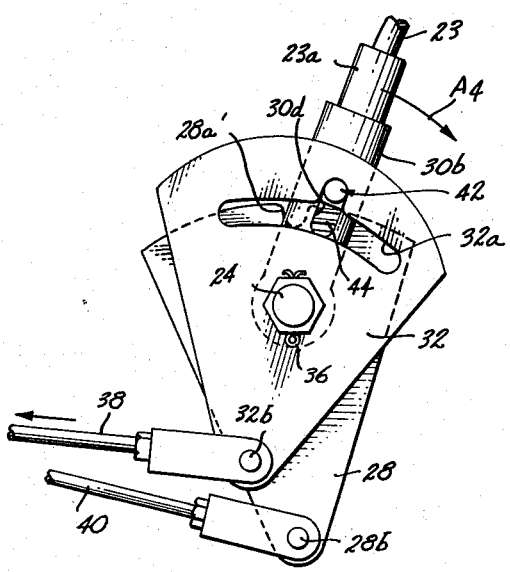
Figure 5 is a similar view in which the mechanism is shown in process of shifting into second-speed or intermediate-gear forward position.
Figure 6:
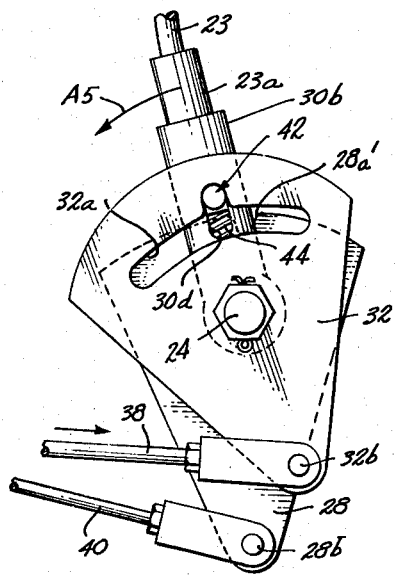
Figure 6 is a similar view with the mechanism shown in the process of shifting into third-speed or high-gear forward position.

In order to shift from the low or first gear into second or intermediate gear, the operator has merely to swing the shifting arm rearwardly as shown by the arrow A4 in Figure 5, past neutral position and into the opposite limiting position established in the transmission. Such movement is effected without necessity of applying any endwise thrust to the operating arm and without any hesitation or interruption. During this motion, as the pin reaches registry with notch 32a' its end or element 42a is driven instantly into notch 32a' by the spring so as to disengage sector plate 28 and engage sector plate 32. This it does without any interruption in the motion of arm 23. Such rearward motion of the operating arm swings the actuating arm 12 as desired in order to shift the transmission into second gear. Then in order to shift from second gear into third gear, the operator has merely to swing the operating arm 23, as indicated by arrow A5 in Figure 6, in a direct and uninterrupted stroke past neutral and into the opposite position wherein the transmission actuating arm 12 establishes the third gear or drive setting. As a matter of fact, the operator may shift back and forth directly between second and third gear settings at will by direct and uninterrupted swinging motion of the operating arm 23. However, in order to return to reverse gear or low (first) gear, it is necessary for the operator to return the operating arm to the neutral position and then apply endwise thrust to the operating lever. Nevertheless, the necessity or desirability of rapid and easy shifting exists primarily only in connection with shifting from low gear into second gear and in shifting back and forth between second and third gear settings.

It will therefore be evident that the invention meets the objectives set forth hereinabove and has related advantages which make it ideally suitable for standard type transmissions and particularly for transmissions in vehicles which are used for racing purposes. The invention is also particularly well suited for manufacture in kit form to be installed on existing vehicles or as a standard mechanism in production vehicles. These and other aspects of the invention will be recognized by those skilled in the art on the basis of the foregoing disclosure thereof in its preferred form.

I claim as my invention:

1. In an automotive transmission having at least one reverse and three forward drive settings in addition to a neutral setting, with two actuating members thereon each shiftable from an intermediate position corresponding to said neutral setting to either of two oppositely displaced positions respectively placing the transmission in each of its different drive settings, the first such actuating member being operable to shift the transmission into reverse gear and a first-speed gear forward, and the second such actuating member being operable to shift the transmission into second and third-speed gears forward, respectively, means for shifting said actuating members comprising first and second operating members independently pivoted on a common axis, coupling means operatively interconnecting the second and first actuating members and the first and second operating members, respectively, to shift each such actuating member between settings by swinging movement of the associated operating member, the first operating member having an elongated arcuate guide slot formed therein, the second operating member having an arcuate guide edge formed thereon, shifting arm means including an arm and an arm support carrying said arm by one end disposed transversely to said axis to permit swinging thereof about said axis at a location adjacent said operating members, and to permit longitudinal movement of the arm, locking means carried by said shifting arm means and having a first element projecting into said guide slot for movement along the slot and a second element overlapping said guide edge for movement along said edge, said locking means being rigid with the arm, the outer edge of said guide slot having a notch intermediate its ends which removably accommodates the first element, spring means normally urging said locking means outwardly to lodge said first element in said notch when in registry therewith and thereby retract the second element from the second operating member, whereby the arm and first operating member are interlocked for conjoint swinging about said axis independently of the second operating member, the guide edge also having a notch therein intermediate its ends which removably accommodates the second element and into which the latter may be moved when in registry therewith, by inward movement of said second element effected by the arm forced manually inwardly against the force of the spring means, whereby the first element is aligned with the guide slot and the arm and second operating member are interlocked for conjoint swinging about said axis independently of the first operating member.

2. In an automotive transmission having at least one reverse and three forward drive settings in addition to a neutral setting, with two actuating members thereon each shiftable from an intermediate position corresponding to said neutral setting to either of two oppositely displaced positions respectively placing the transmission in each of its different drive settings, the first such actuating member being operable to shift the transmission into reverse gear and a first-speed gear forward, and the second such actuating member being operable to shift the transmission into second and third-speed gears forward, respectively, means for shifting said actuating members comprising first and second operating levers independently pivoted on a common axis intermediate the ends thereof, coupling means operatively interconnecting the second and first actuating members and corresponding end portions of the first and second operating levers, respectively, to shift each such member between settings by swinging movement of the associated lever, the first operating lever having an elongated guide slot formed in its end portion opposite its first-named end portion, the second operating lever having an elongated guide edge formed on its end portion opposite its first-named end portion and substantially parallel to said slot, shifting arm means including an arm and an arm support carrying said arm by one end disposed transversely to said axis to permit swinging thereof about said axis at a location adjacent said levers, and to permit longitudinal movement of the arm, locking means carried by said shifting arm means and having a first element projecting into said guide slot for movement along the slot and a second element overlapping said guide edge for movement along said edge, said locking means being rigid with the arm, the outer edge of said guide slot having a notch intermediate its ends which removably accommodates the first element, spring means normally urging said locking means outwardly to lodge said first element in said notch when in registry therewith and thereby retract the second element from the second lever, whereby the arm and first lever are interlocked for conjoint swinging about said axis independently of the second lever, the guide edge also having a notch therein intermediate its ends which removably accommodates the second element and into which the latter may be moved when in registry therewith, by inward movement of said second element effected by the arm forced manually inwardly against the force of the spring means, whereby the first element is aligned with the guide slot and the arm and second lever are interlocked for conjoint swinging about said axis independently of the first lever.

3. The combination defined in claim 2, wherein the arm support and operating levers are mounted on a common shaft, with the arm support interposed between the levers, and wherein the locking means elements comprise elements projecting transversely from opposite sides of the arm.

4. The combination defined in claim 3, wherein the arm support comprises a sleeve in which the end of the arm is slidably received and which has longitudinally extending side slots on opposite sides thereof, the locking means comprising a pin projecting transversely from the arm through said side slots to engage the respective operating levers, the spring means comprising a spring received in the base of the sleeve and reacting outwardly against the end portion of the arm.

5. In an automotive transmission having at least one reverse and three forward drive settings in addition to a neutral setting, with two actuating members thereon each shiftable from an intermediate position corresponding to said neutral setting to either of two oppositely displaced positions respectively placing the transmission in each of its different drive settings, the first such actuating member being operable to shift the transmission into reverse gear and a first-speed gear forward, and the second such actuating member being operable to shift the transmission into second and third-speed gears forward, respectively, means for shifting said actuating members comprising first and second operating members independently pivoted on a common axis, coupling means operatively interconnecting the second and first actuating members and the first and second operating members, respectively, to shift each such actuating member between settings by swinging movement of the associated operating member, the first operating member having a guide slot formed therein, the second operating member having a guide edge formed thereon, shifting arm means including an arm and an arm support carrying said arm by one end disposed transversely to said axis to permit swinging thereof about said axis at a location adjacent said operating members, and to permit longitudinal movement of the arm, locking means carried by said shifting arm means and having a first element projecting into said guide slot for movement along the slot and a second element overlapping said guide edge for movement along said edge, said locking means being rigid with the arm, one edge of said guide slot having a notch intermediate its ends which removably accommodates the first element, spring means normally urging said locking means in a direction to lodge said first element in said notch when in registry therewith and thereby retract the second element from the second operating member, whereby the arm and first operating member are inerlocked for conjoint swinging about said axis independently of the second operating member, the guide edge also having a notch therein intermediate its ends which removably accommodates the second element and into which the latter may be moved when in registry therewith, by movement of said second element effected by the arm forced manually inwardly against the force of the spring means, whereby the first element is aligned with the guide slot and the arm and second operating member are interlocked for conjoint swinging about said axis independently of the first operating member.

References Cited in the file of this patent

UNITED STATES PATENTS

| | | |
|---|---|---|
| 1,780,898 | Blood et al. | Nov. 11, 1930 |
| 2,115,089 | Tenney | Apr. 26, 1938 |
| 2,428,892 | Plexico | Oct. 14, 1947 |